United States Patent [19]

Ferguson

[11] 4,408,329
[45] Oct. 4, 1983

[54] LASER DEVICE WITH INTRARESONATOR HARMONIC GENERATOR

[75] Inventor: Gerald D. Ferguson, Yardley, Pa.

[73] Assignee: The United States of America as represented by the Secretary of the Navy, Washington, D.C.

[21] Appl. No.: 965,755

[22] Filed: Dec. 4, 1978

[51] Int. Cl.$^3$ .............................................. H01S 3/10
[52] U.S. Cl. ...................................... 372/21; 372/22; 372/26; 372/10
[58] Field of Search ..................... 331/94.5 N, 94.5 F, 331/94.5 Q, 94.5 C, 94.5 D, 94.5 M, 94.5 S

[56] References Cited

U.S. PATENT DOCUMENTS

| | | | |
|---|---|---|---|
| 3,464,026 | 8/1969 | Woodbury et al. | 331/94.5 C |
| 3,508,166 | 4/1970 | Simmons et al. | 331/94.5 C |
| 3,564,454 | 2/1971 | Hook et al. | 331/94.5 C |
| 3,740,663 | 6/1973 | Andringa | 331/94.5 Q |
| 3,831,106 | 8/1974 | Ward | 331/94.5 Q |
| 3,975,693 | 8/1976 | Barry et al. | 331/94.5 N |

Primary Examiner—William L. Sikes
Assistant Examiner—Leon Scott, Jr.
Attorney, Agent, or Firm—R. S. Sciascia; Henry Hansen

[57] ABSTRACT

A laser device for generating frequency-doubled laser pulses at maximum efficiency. A laser rod is optically pumped to radiate unpolarized light at $1.064\mu$ wavelength for transmission within a ring-type resonator defined by a flat mirror and a turning prism. The light from one end of the rod is linearly polarized by a beam splitter into two parallel beams of orthogonal components which are transmitted through an $0.532\mu$ output mirror, a frequency doubler phase matched for one component, and a Q-switch, to the turning prism for return along the beam of the other component to the beamsplitter. The output mirror, doubler and Q-switch are substantially ineffective during the pumping cycle, and because the component beam axes are reversed, the light does not return to the rod for stimulating light emission. After peak level pumping, however, the Q-switch is biased to rotate each component one quarter wavelength and return the components to combine and reenter the rod for stimulated light emission. The frequency doubler, now receiving high power radiation, transforms a portion of the returning $1.064\mu$ component to a $0.532\mu$ component which is then reflected out of the resonator by the output mirror.

14 Claims, 5 Drawing Figures

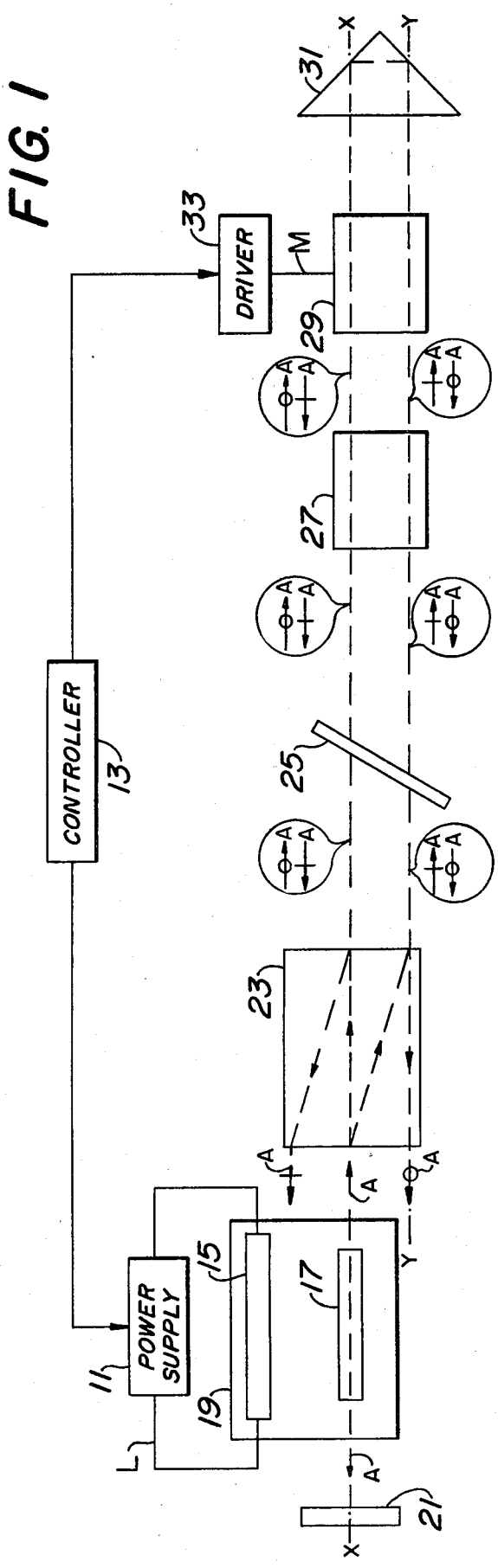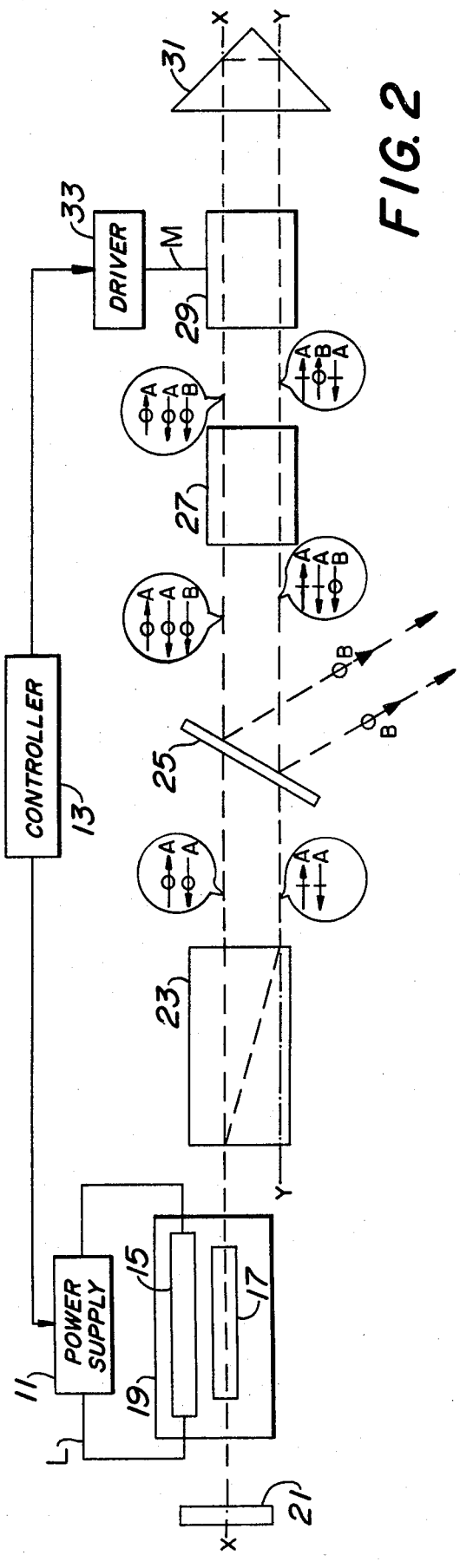

LASER DEVICE WITH INTRARESONATOR HARMONIC GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to improvements in optical oscillators such as laser devices, and more particularly to high input power optical oscillators with frequency doubled outputs.

Laser light in the green spectrum (0.500–0.570 micron wavelengths) is particularly useful for underwater and airborne optical communications, radar, and viewing applications. Various gases, liquids with dyes, and metal vapors are available as green laser mediums but they have unacceptably long pulsing characteristics and are not sufficiently developed to meet the demands of the aforementioned application. Solid state laser mediums are particularly desirable due to their short pulse (10–20 nanoseconds) characteristics, but there is none suitable in the green spectrum. For example, Nd:YAG and ruby are particularly popular solid state mediums, but they are in the red spectrum, i.e., $1.06\mu$ and $0.6963\mu$ wavelengths, respectively. One technique for obtaining a desired laser radiation is by frequency doubling the light output. See for example applicant's U.S. Pat. No. 4,068,190 which discloses a Nd:YAG laser whose output is doubled to yield green light. Dual beams of equal polarity distribution are formed within the resonator in order to provide higher level energy transfer through the doubler without thermal damage to the optical components. Even at the higher input power level, however, the doubler does not operate at peak efficiency due to the reduction in energy level at the resonator output.

SUMMARY OF THE INVENTION

Accordingly, it is a general purpose of the present invention to provide a more efficient laser device with frequency doubling. Another object of the invention is to enable frequency doubling at a peak efficiency energy level. Still another object is to provide a laser device which can operate at high power input levels and which distributes the radiation over large areas in temperature-limited optical components. A still further object is to provide a green laser device which utilizes a solid state medium with minimum power loss due to frequency doubling.

Briefly, these and other objects of the invention are accomplished with a solid state laser rod optically pumped to radiate unpolarized light at one frequency within a resonator formed between a flat reflector and an offset reflector. The light from one end of the rod is linearly polarized by a beamsplitter into parallel beams of orthogonal components which are transmitted through another mirror which reflects the second harmonic, a frequency doubler which is phase-matched for one component, and a Q-switch, to the offset reflector. Each beam is returned along the axis of the other beam to the beamsplitter and past the laser rod to dissipate in the surrounding space. After peak level pumping, a controller biases the Q-switch to rotate each orthogonal component and return them to the beamsplitter where they combine and re-enter the rod. Stimulated emission then occurs within the resonator. Prior to resonation, the energy level is too low to cause frequency doubling, but at the higher level, a portion of the laser radiation is transformed to the second harmonic which is then reflected out of the resonator by the mirror as the laser output signal.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a schematic representation of a laser device according to the present invention operating in an optical pumping mode;

FIG. 2 is a schematic representation of the laser device of FIG. 1 operating in a resonating and stimulated light emission mode;

DESCRIPTION OF THE PREFERRED EMBODIMENT

Figure 3:
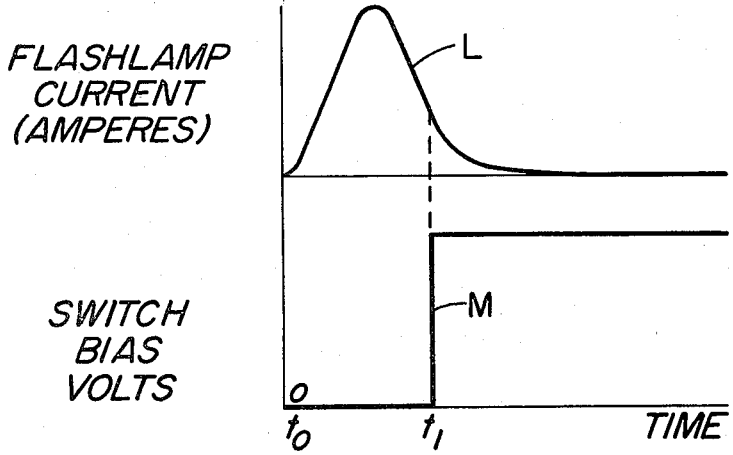
FIGS. 3 and 4 are timing diagrams of signals generated within the device.

Referring now to the drawing, wherein like reference characters designate like or corresponding parts throughout the several views, there is shown in FIG. 1 a laser device including a power supply 11 such as a charged capacitor operatively connected to a controller 13 which pulses a flash lamp 15 for optically pumping a Nd:YAG laser rod 17 within a cavity 19. Rod 17 produces an unpolarized, 6.3 mm diameter light beam A along axis X—X of $1.064\mu$ wavelength, which together with a fully reflective flat mirror 21 and a Poro prism 31 juxtaposed from opposite ends of rod 17 forms a ring-type resonator.

Interposed between rod 17 and prism 31 along axis X—X are a beam splitter 23, a partially reflective flat mirror 25, a frequency doubler 27, and a Q-switch 29.

Beamsplitter 23 is a birefringent calcite rhomb crystal which linearly polarizes the radiation from rod 17 into two parallel beams of ordinary (O) and extraordinary (E) orthogonal components, respectively, symbolically represented in the drawing as →A and ⇢A. The component O is transmitted straight through while component E is refracted on a parallel axis Y—Y displaced 7 mm from axis X—X, i.e. 0.7 mm separation between beams.

Partially reflective mirror 25 is angularly displaced from the axes X—X and Y—Y and specially coated to transmit light beam A of $1.064\mu$ wavelength from rod 17 and to reflect the second harmonic light beam B of $0.532\mu$ wavelength out of the resonance chamber.

Frequency doubler 27 is temperature and angle tuned to convert component E of beam A to component O of light beam B at $0.532\mu$. Doublers suitable for these particular wavelengths are lithium iodide ($LiIO_3$) or deuterated cesium dihydrogen arsenate (DCDA) crystals with antireflection coated windows.

Figure 5:
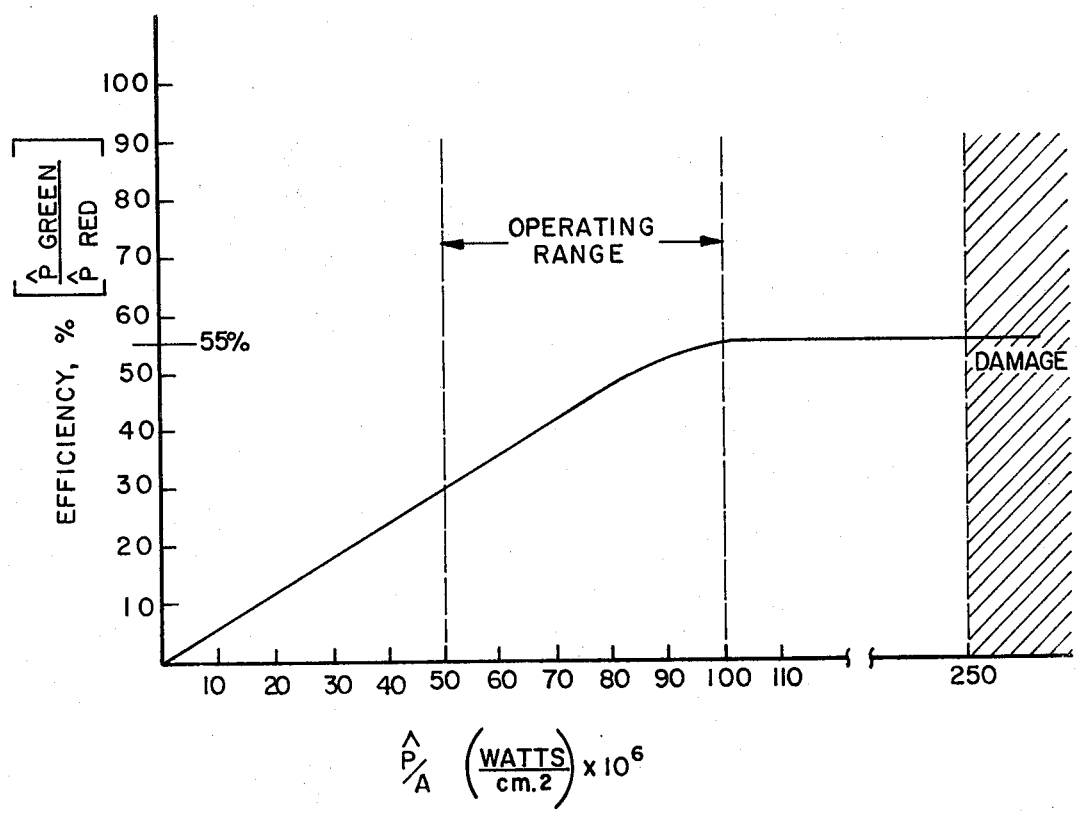
FIG. 5 is a graphical representation of the efficiency characteristic of a typical frequency doubler utilized in the laser device of FIG. 1.

The efficiency of frequency doublers, i.e. peak power of the fundamental frequency input ($P_f$) divided into the peak power of the second harmonic frequency output ($P_{sh}$), typically vary directly up to a given level of light energy input after which further increases in level usually causes irreversible crystal damage. FIG. 5 is a graphical representation of the efficiency characteristics for a DCDA crystal. The efficiency is linearly proportional up to about $100 \times 10^6$ watts/cm² input and levels off at about 55% efficiency thereafter. The desired operating range (50 to $100 \times 10^6$ watts/cm²) is on the positive slope near peak efficiency, but risk of crystal damage arises if the input exceeds this range.

Q-switch 29, such as a $LiNbO_3$ Pockel's cell, is biased by a driver 33 which, in turn, is synchronized with flashlamp 15 by controller 13. As shown in FIG. 3, a bias signal M to Q-switch 29 occurs on the negative slope of signal L to flashlamp 15 thus insuring peak level pumping in rod 17. When not biased, Q-switch 29 has no effect on the radiation, but when biased by driver 33 it acts as a quarterwave plate with each pass of radiation rotating each component O and E of the frequency from rod 17 90°, and each component of the doubled frequency 180°.

Prism 31 is aligned with the axes X—X and Y—Y so that light beams A and B of either component O or E received along one axis will be reflected, offset, and returned along the other axis.

Operation of the laser device will now be described. In the optical pumping mode of FIG. 1, controller 13 causes the signal L (FIG. 3) to be applied at time $t_o$ to flashlamp 15 while driver 33 remains unbiased. The high light energy condition established within cavity 19 optically pumps rod 17 to radiate unpolarized 1.064μ light beam A from either end of rod 17. Beamsplitter 23 polarizes the beam A into components O and E which continue on parallel axes X—X and Y—Y, respectively, to prism 31. Partially reflective mirror 25 transmits both components of beam A therethrough. Due to the low level of radiation during pumping, frequency doubler 27 has no effect and transmits beam A through to Q-switch 29. There being no bias signal M, Q-switch 29 also has no effect on the either component of beam A. Consequently, beam A of components O and E retrace the direction of the opposite polarization on axes Y—Y and X—X, respectively. Similarly, each component E and O of beam A remains unaltered and again enters the beamsplitter 23. However, because the direction of each component is reversed they do not recombine and reenter rod 17 to cause resonance.

Figure 4:
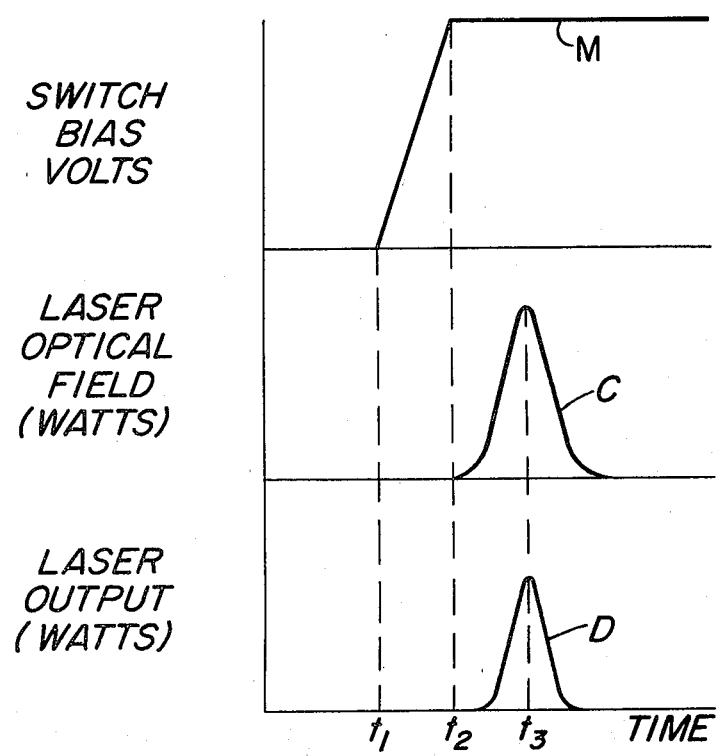

After allowing sufficient time for peak optical pumping, controller 13 at time $t_1$ causes Q-switch 29 to be rapidly switched on by bias signal M. Each component O and E of beam A entering Q-switch 29 is rotated to its opposite component (one quarter wavelength with each pass). As shown in FIG. 2, components O and E now re-enter the beamsplitter 23 on axes X—X and Y—Y, respectively, to recombine into a single beam on axis X—X and enter rod 17 to stimulate laser emission. A normal Q-switched laser pulse C (FIG. 4) then evolves.

As rod 17 becomes heated, birefringence sets in due to a radial profile in temperature and a corresponding radial stress. This birefringent stress acts to circularly polarize beam A as it transmits through rod 17 causing unequal distribution of components O and E. However, upon returning, the phase is delayed again causing the original component to be transferred into its orthogonal component. Hence, the power from one component is not lost due to the birefringence effect.

Due to the stimulated higher light energy level, the efficiency of frequency doubler 27 significantly increases for component E of beam A (see FIG. 5). Some of component E of beam A from rod 17 on axis Y—Y is converted to component O of beam B which passes sequentially through Q-switch 29, prism 31, Q-switch 29 and doubler 27 to be reflected out of the resonator by mirror 25. Additional component E of beam A from Q-switch 29 on axis Y—Y is also converted to component O of beam B to be reflected out of the resonator by mirror 25 parallel to the other output beam B. The remaining undoubled beams A on axes X—X and Y—Y pass through mirror 25 and re-enter rod 17 for continuing resonance. Output beams B are formed on both axes X—X and Y—Y of the resonator and their reflection by mirror 25 constitute the stimulated light emission output pulse D of FIG. 4.

Some of the many advantages of the invention should now be readily apparent. For example, a novel laser device is provided which enables efficient frequency doubling at high average input pumping levels. Such levels can be achieved under conditions where normally birefringent losses would greatly reduce laser performance. By the unique resonator arrangement, the radiation is distributed over a large area in both the frequency doubler and the Q-switch. This lessens the chance of crystal damage when operating at very high input pulse energies. It also distributes the average power over a larger area thereby lowering the temperature gradients within the crystals, and thereby preventing the Q-switch, holdoff and frequency doubler, mismatch from reducing the average power output. The present invention is of particular utility in underwater and airborne optical communications radar and viewing applications where use of solid state laser mediums such as Nd:YAG lasers with frequency doubling is possible to obtain desirable green light output. The simplicity of the apparatus also affords ease of manufacture maintenance and repair, and low cost.

It will be understood the various changes in the details, steps and arrangement of parts, which have been herein described and illustrated in order to explain the nature of the invention, may be made by those skilled in the art within the principal and scope of the invention as expressed in the appended claims.

What is claimed is:

1. A laser system, comprising, in combination:

a laser means for radiating light of a first wavelength in opposite directions along a first path when energized;

first reflection means positioned on said first path for reflecting the light from one direction into the laser means;

beamsplitter means positioned within the first path for polarizing the light from the other direction into a first component of radiation along the first path and into a second component along a second path parallel to said first path;

second reflection means positioned within said first and second paths for reflecting light in the first path into the second path and light in the second path into said first path;

Q-switch means positioned within said first and second paths for selectively rotating the polarized components one fourth of said first wavelength when energized;

frequency multiplying means positioned within said first and second paths between said beamsplitter means and said Q-switch means for mulitplying the frequency of light of said first wavelength and second component to produce light along said first and second paths of a second wavelength and of the second component;

third reflection means highly reflective to said first wavelength and highly transmissive to said second wavelength angularly positioned to first and second paths and between said beamsplitter and said frequency multiplier means for reflecting the light of said second wavelength in one direction along parallel third and fourth paths angularly displaced from said first and second paths; and synchronizing means connected for sequentially energizing said laser means and said Q-switch means.

2. A laser system according to claim 1 wherein said beamsplitter means polarizes and separates said first and second radiated components orthogonal to each other.

3. A laser system according to claim 2 wherein said frequency multiplying means doubles the frequency of light of said first wavelength.

4. A laser system according to claim 3 wherein said first reflection means is a flat, fully-reflecting mirror.

5. A laser system according to claim 4 wherein said second reflection means is a Poro prism with its hypotenuse face normal to said first and second paths for receiving the light and each of the shorter faces reflecting the light from one path into the other path.

6. A laser system according to claim 5 wherein said beamsplitter means is a birefringent crystal.

7. A laser system according to claim 7 wherein said third reflection means is angularly positioned at approximately 45° to said first and second paths.

8. A laser system according to claim 1 wherein said laser means includes a medium of a solid state material.

9. A laser system according to claim 8 wherein said material is neodymium-doped yttrium aluminum garnet.

10. A laser system according to claim 9 wherein said frequency multiplying means is a second harmonic generator.

11. A laser system according to claim 10 wherein said first reflection means is a flat, fully-reflecting mirror.

12. A laser system according to claim 11 wherein said second reflection means is a Poro prism with its hypotenuse face normal to said first and second paths for receiving the light and each of the shorter faces reflecting the light from each path into the other path.

13. A laser system according to claim 12 wherein said Q-switch means is a Pockel's cell.

14. A laser system according to claim 13 wherein said beamsplitter means is a birefringent crystal.

* * * * *

UNITED STATES PATENT AND TRADEMARK OFFICE
CERTIFICATE OF CORRECTION

PATENT NO. : 4,408,329

DATED : October 4, 1983

INVENTOR(S) : Gerald D. Ferguson

It is certified that error appears in the above-identified patent and that said Letters Patent are hereby corrected as shown below:

Column 6, line 5, "7" should be changed to -- 6 --.

Signed and Sealed this

Seventeenth Day of July 1984

[SEAL]

Attest:

Attesting Officer

GERALD J. MOSSINGHOFF

Commissioner of Patents and Trademarks